UNITED STATES PATENT OFFICE.

LUDWIG MOND AND GEORGE ESCHELLMANN, OF NORTHWICH, COUNTY OF CHESTER, ENGLAND, ASSIGNORS TO BRUNNER, MOND & CO., (LIMITED,) OF SAME PLACE.

PROCESS OF OBTAINING CHLORINE.

SPECIFICATION forming part of Letters Patent No. 416,038, dated November 26, 1889.

Application filed January 16, 1889. Serial No. 296,536. (No specimens.) Patented in England December 15, 1887, No. 17,273.

*To all whom it may concern:*

Be it known that we, LUDWIG MOND and GEORGE ESCHELLMANN, manufacturing chemists, subjects of the Queen of Great Britain and the Emperor of Austria-Hungary, respectively, both residing at Northwich, in the county of Chester, in the Kingdom of England, have invented certain new and useful Improvements in the Manufacture of Chlorine, (for which we have received Letters Patent in England, dated December 15, 1887, No. 17,273,) of which the following is a specification.

This improvement relates to the manufacture of chlorine from hydrochloric acid or ammonium chloride by means of magnesia.

If magnesia is treated with hydrochloric acid or ammonium chloride at a certain temperature, in the first case magnesium chloride or oxychloride and steam are formed, and in the second case magnesium chloride or oxychloride and steam and ammonia-gas. In order to obtain chlorine, this magnesium chloride or oxychloride is heated to a higher temperature and oxidized with dried air. By this method all the chlorine is set free, but not without being mixed with a large amount of hydrochloric-acid gas. Treating magnesia with hydrochloric acid or ammonium chloride, a considerable amount of the steam which is formed by the reactions is absorbed by the magnesium chloride or oxychloride formed, and this absorbed quantity of water being evolved in the treatment at a higher temperature by air, causes the retrograde formation of hydrochloric acid, which quantity varies from twenty to forty per cent. of the total quantity of the chlorine.

This invention has for its object the prevention of this hydrochloric-acid formation. For this purpose we mix with the magnesia before it is treated with hydrochloric acid or ammonium chloride a certain amount of a fixed alkali chloride, preferably chloride of potassium or sodium, or a mixture of the two. The quantity of the alkali chlorides can be varied considerably. We find that five to ten per cent. of the quantity of the magnesia is sufficient. If this magnesia mixed with the alkali chloride is treated in the way above described, no water, or very little of it, is absorbed by the magnesia, and during the oxidation all the chlorine is obtained as such, and free or nearly free from hydrochloric acid.

In order to carry out this improvement in a practical way, the magnesia is ground with a solution of a certain strength of one of the fixed alkali chlorides, or a mixture of the two—that is, with a solution of the required amount of fixed alkali chloride in a sufficient quantity of water to form with the magnesia a plastic mass—by which means the magnesia is intimately mixed with the alkali chloride. This mass may be formed in any known way into balls, lumps, blocks, &c., and dried; but we find it advantageous for this purpose to add to the magnesia a certain amount of an agglomerating substance. Among many others we prefer an addition of about five to ten per cent. of china-clay, which is inert to the reactions in our process. After the finished oxidation the magnesia is ready for a renewed treatment with hydrochloric acid or ammonium chloride, as the fixed alkali chloride remains unaltered and retains its activity continually.

In order to obtain a continuous manufacture of chlorine from hydrochloric-acid gas, we pass a mixture of hydrochloric-acid gas, and air at a suitable temperature—preferably 450° to 550° centigrade—over or through the balls, blocks, &c., of the magnesia and alkali chloride, as described before. The decomposition of the hydrochloric acid is very much more complete than when using certain copper salts for the same purpose.

Almost any plant now used for treating solids with gases at about the temperature above mentioned will suit this process. We have not designed any special plant therefor, but would recommend the ordinary Deacon chlorine plant as useful for the continuous process.

Throughout this specification we have spoken only of alkali chlorides. It is obvious, however, that if any alkaline salt easily decomposed by hydrochloric acid or ammonium chloride, so as to form the alkali chloride— such, for instance, as the hydrate, carbonate, or even fluoride—were used, they would soon be converted into the chloride, and would then be as efficacious as if the chloride were used originally.

We claim as our invention—

1. The process of obtaining chlorine, which consists in making an intimate mixture of magnesia and a chloride of a fixed alkali, forming the same into lumps, and treating these at a temperature of from 400° to 600° centigrade with vapor of hydrochloric acid or of chloride of ammonium, and then with dried air or oxygen at a suitable temperature, such as described, and collecting the chlorine evolved.

2. Passing the vapor of hydrochloric acid or of chloride of ammonium over a mixture of magnesia, and a chloride of a fixed alkali at the specified temperature, whereby a salt or mixture of salts is produced that will give out chlorine and but little or no hydrochloric acid when dry hot air is subsequently passed over it.

3. The process of manufacturing chlorine from hydrochloric acid, which consists in passing this gas and air or oxygen over or through a mixture of magnesia and the chloride of a fixed alkali.

In testimony whereof we have signed our names to this specification in the presence of two subscribing witnesses.

LUDWIG MOND.
GEORGE ESCHELLMANN.

Witnesses to L. Mond's signature:
W. L. ALDEN,
D. H. FISHER.

Witnesses to G. Eschellmann's signature:
JOHN HAYS,
H. P. SHOOBRIDGE.